United States Patent Office 2,984,688
Patented May 16, 1961

2,984,688

METHODS FOR PRODUCING VINYL ETHERS

Johann Sixt, Munich, Germany, assignor to Wacker-Chemie G.m.b.H., Munich, Germany, a German firm No Drawing. Filed Feb. 16, 1959, Ser. No. 793,257

Claims priority, application Germany Nov. 18, 1955

3 Claims. (Cl. 260—614)

The present invention relates to an improved process for the production of vinyl ethers.

This application is a continuation-in-part of my copending application Serial No. 622,781, filed November 19, 1956 and now abandoned.

Vinyl ethers have been obtained by the reaction of acetylene and alcohols in the presence of alkaline catalysts. Vinyl ethers have also been obtained by reacting a vinyl ester with an alcohol in the presence of a mercury compound such as mercuric oxide or mercuric acetate, for example, and a strong acid catalyst such as sulfuric acid or mercuric sulfate. The reaction which takes place comprises a molecular rearrangement in accordance with the following equation, with the production of an organic acid as a byproduct of the reaction:

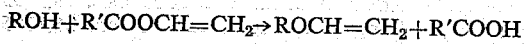

$$ROH + R'COOCH=CH_2 \rightarrow ROCH=CH_2 + R'COOH$$

In the above reaction, both R and R' are lower aliphatic alkyl groups.

Only moderate yields are obtained in accordance with the above process, and there is a marked difference observed between molar yield of the desired vinyl ether and the molar yield of the organic acid formed as the byproduct of the reaction. Theoretically, of course, both products should be obtained in equimolecular yields. When, for example, vinyl acetate is the vinyl ester employed in the reaction, an accurate measurement of each of these variables, namely, the amount of alcohol reacted on the one hand, and the amount of acetic acid formed on the other hand, and also the amount of vinyl acetate reacted, give a fairly accurate indication of the precise course of the reaction so far as conversion and yield are concerned.

It is to be noted, however, that in this reaction when carried out in the usual fashion the conversion based on the amount of organic acid formed is always considerably higher than that based upon the vinyl acetate reacted. The discrepancy is particularly evident in the production of vinyl ethyl ether where, for example, when 1 mol of ethanol is reacted with an excess of vinyl acetate, 6 mols for example, in spite of the fact that 0.6 mol and more of acetic acid are formed only 4 grams of vinyl ethyl ether are obtained, which corresponds to a yield of only 0.055 mol. Calculated as percentage yields, this amounts only to a conversion of but 5% of the alcohol employed with a mol percent yield of vinyl ether based upon the acetic acid formed of 0.055:0.6 or 9%. If along with the 0.6 mol of acetic acid 0.6 mol of vinyl ethyl ether had been formed, it would have amounted to a yield of 43.2 grams.

It has now been found that vinyl ethers may be obtained in high yields in accordance with the above reaction and with a relatively high mol percent ratio of vinyl ether being formed compared to the acid byproduct if the vinyl ester is reacted with an aliphatic alcohol having not more than six carbon atoms in the presence of not more than 0.5% of a strong acid and a catalyst comprising mercuric oxide or the mercuric salt of a weak acid at a temperature not higher than 15° C. if the vinyl ether is distilled off from the reaction mixture during the reaction as it is formed. Preferably a reaction temperature of no higher than about −5 to −10° C. is employed together with subatmospheric pressures in the reaction system to aid distillation. Since the vinyl ether produced is immediately distilled off as it is formed, the period during which the vinyl ether is subject to contact with the reaction mixture is as short as possible and side reactions reducing the yield are greatly minimized, with the formation of such undesirable byproducts as acetals and acetoxy acetals being held to a minimum.

As indicated, the distillation of the vinyl ether formed is greatly aided by maintaining the system under a subatmospheric pressure and the distillation can be further accelerated by the introduction of an inert gas into the system during distillation, for example, nitrogen so that the system is swept by the gas stream. Sulfuric acid is preferably employed as the strong acid and from 0.05 to 0.1 percent by weight of the reaction mixture is adequate. The admixture of mercury oxide or of a mercury salt may vary between wide limits; usually 0.5 percent of the reaction mixture is sufficient.

The reaction commences relatively quickly and the vinyl ether formed is distilled off as it is formed. When the reaction is completed the residue comprises the excess of unreacted vinyl ester, the aliphatic acid formed, i.e. acetic acid in the case of vinyl acetate, and the catalyst. By adding further quantities of alcohol the reaction can be continued with the formation of further amounts of the desired vinyl ether. The residue may be worked up in the usual fashion by the addition of sodium acetate followed by distillation. The process described may also be carried out in a continuous manner by providing a continuous supply of the reactants to the reactor in the proper molecular ratio and continuously distilling off the vinyl ether formed while continuously removing the unreacted residue, working it up and recycling the vinyl ester back to the system.

In order further to illustrate the present invention the following examples are given:

Example 1

Into a vessel provided with a stirrer, a connecting fractionating column and a dephlegmator there is introduced a reaction mixture consisting of 340 grams of vinyl acetate, 92 grams of ethyl alcohol, 3 grams of mercury acetate and 0.05 gram of sulfuric acid cooled to a temperature of −15° C. The mixture is stirred and, as the reaction commences, distillation of the ethyl vinyl ether formed is carried out immediately with the system at a pressure of 18 mm. of mercury. The distillate is collected in a low temperature receiver. The boiling point in the reactor gradually rises to −6° C. After 3½ hours 128 grams of pure ethyl vinyl ether are collected and 112 grams of acetic acid remain in the reaction vessel, as determined by an alkaline titration. This corresponds to a conversion of 89% calculated upon the ethyl alcohol consumed with a mol percent yield of ethyl vinyl ether, calculated upon the acetic acid formed, of 95.5%.

Example 2

Into a reaction vessel of the type described in Example 1 is introduced a mixture of 500 grams of vinyl acetate, 32 grams of methyl alcohol, 4 grams of mercuric acetate and 0.06 gram of concentrated sulfuric acid and the mixture is stirred for a short time at −15° C. Stirring is then continued and distillation of the methyl vinyl ether formed is effected under a pressure of 35 mm. of mercury. When the rate at which the reaction product is distilled over slackens somewhat, an additional amount of 64 grams of methyl alcohol is slowly added to the reaction mixture without halting the distillation or breaking the vacuum within the vessel. During the course of the reaction 159 grams of methyl vinyl ether are distilled over and 171 grams of acetic acid remain in the residue as determined by titration. This amounts to a yield of 91% calculated upon the methyl alcohol consumed with a mol percent yield of methyl vinyl ether based upon the acetic acid formed of 96%.

*Example 3*

Vinyl acetate is reacted with methyl alcohol to form methyl vinyl ether as described in Example 2. The apparatus employed for carrying out the reaction comprises a packed distilling column provided with suitable heating means at the base, with a dephlegmator and with a suitable cooling jacket in order to maintain any desired low temperature within the column. In carrying out the reaction a vinyl acetate mixture containing 0.8% by weight of mercuric acetate and 0.012% by weight of concentrated sulfuric acid, and cooled to a temperature of −15° C., is fed to the top of the column together with methyl alcohol in the ratio of 16 parts by weight of vinyl acetate to each part by weight of methyl alcohol. The packed column employed as the reactor is maintained at −20° C. by circulating a cooling medium through the cooling jacket and the entire system is maintained under a pressure of 35 mm. of mercury by means of a vacuum pump. Vinyl methyl ether is formed as the reaction product and is distilled off continuously at the head of the column at a temperature of about −15° C. A mixture of acetic acid and the excess vinyl acetate employed is obtained at the base of the column. The conversion achieved amounts to 88% based upon the methyl alcohol consumed and the yield of methyl vinyl ether on a mol percent basis, calculated upon the acetic acid formed, is 95%.

*Example 4*

Into a reaction vessel of the type described in Example 1 is introduced a mixture of 75 grams of vinyl propionate, 64 grams of methyl alcohol, 3 grams of mercuric acetate and 0.04 gram of concentrated sulfuric acid. The reaction mixture is stirred at a temperature of −15° C. and, as the reaction commences, the methyl vinyl ether formed is distilled off while maintaining the system under a pressure of 35 mm. of mercury. The distillate is collected in a low temperature receiver and, after two hours, 90 grams of methyl vinyl ether are obtained which is equivalent to a yield of 85 mol percent based upon the amount of propionic acid formed.

Similarly, by employing propyl alcohol, butyl alcohol or allyl alcohol the corresponding propyl vinyl ether, butyl vinyl ether or allyl vinyl ether are formed. When producing the higher vinyl ethers it is preferred to employ lower pressures, as brought out, to carry out the distillation of the reaction product as it is formed.

I claim:

1. In a process for the production of a vinyl ether which comprises reacting vinyl acetate with a lower aliphatic alcohol having less than six carbon atoms in the presence of mercuric acetate and less than 0.03% of sulfuric acid based on the weight of the reactants, the step which comprises distilling off the vinyl ether as it is formed while maintaining the reaction mixture at a temperature of −5° C. to −15° C. and under a pressure no higher than 35 mm. of mercury.

2. Process in accordance with claim 1 in which the alcohol is methanol.

3. Process in accordance with claim 1 in which the alcohol is ethanol.

References Cited in the file of this patent

UNITED STATES PATENTS

| 1,796,690 | Herrmann et al. | Mar. 17, 1931 |
| 2,579,411 | Adelman | Dec. 18, 1951 |
| 2,667,517 | Longley | Jan. 26, 1954 |

FOREIGN PATENTS

| 430,764 | Great Britain | June 25, 1935 |

OTHER REFERENCES

Schildknecht et al.: Ind. and Eng. Chem., vol. 39, No. 2 (1947), pages 180–186.